US012689941B2

(12) United States Patent
Jamil et al.

(10) Patent No.: US 12,689,941 B2
(45) Date of Patent: Jul. 21, 2026

(54) TARGETED PARENT SELECTION FOR BATTERY-POWERED DEVICES

(71) Applicant: ITRON, INC., Liberty Lake, WA (US)

(72) Inventors: Imad Jamil, Beynes (FR); Keith Wayne Barnes, Waseca, MN (US); Fabrice Monier, Bry sur Marne (FR); Thomas F. Uhling, Spokane Valley, WA (US)

(73) Assignee: ITRON, INC., Liberty Lake, WA (US)

( * ) Notice: Subject to any disclaimer, the term of this patent is extended or adjusted under 35 U.S.C. 154(b) by 356 days.

(21) Appl. No.: 18/457,766

(22) Filed: Aug. 29, 2023

(65) Prior Publication Data

US 2023/0413110 A1 Dec. 21, 2023

Related U.S. Application Data

(63) Continuation of application No. 17/318,634, filed on May 12, 2021, now Pat. No. 11,770,738.

(51) Int. Cl.
| | |
|---|---|
| *H04W 40/04* | (2009.01) |
| *H04W 28/06* | (2009.01) |
| *H04W 40/12* | (2009.01) |
| *H04W 76/10* | (2018.01) |
| *H04W 84/18* | (2009.01) |

(52) U.S. Cl.
CPC .......... *H04W 28/06* (2013.01); *H04W 40/04* (2013.01); *H04W 40/12* (2013.01); *H04W 76/10* (2018.02); *H04W 84/18* (2013.01)

(58) Field of Classification Search
None
See application file for complete search history.

(56) References Cited

U.S. PATENT DOCUMENTS

| | | | |
|---|---|---|---|
| 11,770,738 B2 * | 9/2023 | Jamil | H04W 28/06 370/329 |
| 2005/0135309 A1 * | 6/2005 | Hester | H04W 40/10 370/331 |
| 2005/0204042 A1 * | 9/2005 | Banerjee | H04L 12/6418 709/226 |
| 2008/0101384 A1 | 5/2008 | Lee | |
| 2008/0188177 A1 * | 8/2008 | Tan | H04W 16/26 455/11.1 |
| 2008/0240078 A1 | 10/2008 | Thubert et al. | |
| 2011/0001612 A1 | 1/2011 | Chung et al. | |
| 2011/0063999 A1 | 3/2011 | Erdmann et al. | |
| 2013/0028143 A1 * | 1/2013 | Vasseur | H04W 40/22 370/256 |

(Continued)

OTHER PUBLICATIONS

Extended European Search Report for Application No. 22808065.1 dated Mar. 3, 2025.

(Continued)

*Primary Examiner* — Brian S Roberts
(74) *Attorney, Agent, or Firm* — Artegis Law Group, LLP

(57) ABSTRACT

Targeted parent selection for nodes within a network include, filtering, by a node in a mesh network using one or more first network optimization criteria, a set of potential parent nodes to generate a subset of potential parent nodes; selecting, by the node using one or more second network optimization criteria, a target parent node from the subset of potential parent nodes; and transmitting, by the node, a connection request to the target parent node.

20 Claims, 7 Drawing Sheets

(56)                    References Cited

U.S. PATENT DOCUMENTS

| | | | |
|---|---|---|---|
| 2013/0070646 A1 | 3/2013 | Myers et al. | |
| 2013/0128850 A1* | 5/2013 | Fukushima | H04N 1/32765 |
| | | | 370/329 |
| 2014/0098685 A1* | 4/2014 | Shattil | H04L 67/1014 |
| | | | 370/252 |
| 2016/0021513 A1 | 1/2016 | Marti et al. | |
| 2016/0212698 A1* | 7/2016 | Guo | H04W 40/10 |
| 2016/0337954 A1* | 11/2016 | Gulati | H04W 48/17 |
| 2017/0142633 A1 | 5/2017 | Tohzaka et al. | |
| 2017/0244471 A1 | 8/2017 | Nagakubo et al. | |
| 2017/0311360 A1* | 10/2017 | Singh | H04W 4/80 |
| 2018/0167955 A1 | 6/2018 | Prakash et al. | |
| 2018/0262401 A1 | 9/2018 | Shah et al. | |
| 2019/0394737 A1* | 12/2019 | Luo | H04L 45/488 |
| 2020/0021968 A1* | 1/2020 | Uhling | H04W 8/005 |
| 2020/0021969 A1 | 1/2020 | Uhling et al. | |
| 2021/0014770 A1* | 1/2021 | Qi | H04L 45/48 |
| 2021/0306931 A1* | 9/2021 | Huang | H04W 40/34 |

OTHER PUBLICATIONS

Shakya et al., "SEEOF: Smart Energy Efficient Objective Function", Adapting RPL Objective Function to enable an IPv6 Meshed Topology Solution for Battery Operated Smart Meters, 2017, 6 pages.

* cited by examiner

400

| Node ID 402 | Average RSSI 406 | Load Size Indicator 408 | Hop Count 410 |
|---|---|---|---|
| 7 | -70 | 20 | 2 |
| 5 | -62 | 15 | 2 |
| 3 | -62 | 30 | 2 |
| 6 | -62 | 15 | 3 |
| 4 | -77 | 40 | 1 |

420
422
424
426
428

700

TARGETED PARENT SELECTION FOR BATTERY-POWERED DEVICES

CROSS-REFERENCE TO RELATED APPLICATIONS

This application is a continuation of the co-pending U.S. patent application titled, "Targeted Parent Selection for Battery-Powered Devices," filed May 12, 2021, and having Ser. No. 17/318,634. The subject matter of this related application is hereby incorporated herein by reference.

BACKGROUND

Field of the Various Embodiments

Various embodiments of the present disclosure relate generally to wireless network communications and, more specifically, to targeted parent selection for battery-powered devices (BPDs).

Description of the Related Art

A conventional wireless network includes a plurality of nodes configured to communicate with one another. In certain types of heterogeneous wireless networks, different types of nodes communicate and interact with one another within the network, including mains powered device (MPD) nodes and battery powered device (BPD) nodes. MPD nodes typically are coupled to a power grid and have continuous access to power (except during power outages), which allows MPD nodes to receive and transmit data more or less continuously. On the other hand, BPD nodes are powered by batteries and therefore have only a finite supply of power. To manage the finite supply of power, BPD nodes normally remain in a powered-down state and power on only at intermittent intervals.

A conventional network manages the functionality of nodes by optimizing the functionality of mains powered nodes. Such techniques often do not account for battery life restrictions a given BPD node may have. Accordingly, conventional node management have several drawbacks when used with BPD nodes.

At least one drawback is that conventional networks typically enable large and complex subtrees of nodes within a given wireless network and are not configured to account for restrictions associated with BPD nodes. In particular, conventional networks include parameters that allow large numbers of nodes and large numbers of hops (e.g., connecting devices between endpoints) within a given subtree. A given node within a large, complex subtree may be required to perform various complex operations associated with managing child nodes and managing communications between nodes. Though MPD nodes can draw from a large power source to perform these complex operations, BPDs have limited access to power. As a result, such complex subtrees are often incompatible with limited-power BPD nodes, as these complex subtrees require the limited-power BPD nodes to utilize large amounts of the available power resources in order to perform the complex operations.

Another drawback of conventional networks using known techniques is that a node joining the network may use a standard objective function to select a specific node as a parent node for establishing a connection. A standard objective function is an algorithm that optimizes a criterion. However, a BPD node joining a network requires balancing multiple criteria, including factors such as battery consumption and communications latency, in addition to conventional factors like signal strength. Consequently, a BPD node using an objective function to select a parent node would require a highly complex objective function that cannot be solved efficiently. Solving the objective function occupies a large amount of processing resources, quickly draining available battery resources. As a result, the BPD may only be connected to a network for a limited time before requiring maintenance and upkeep.

As the foregoing illustrates, what is needed in the art are more effective techniques for defining and managing the functions of battery powered devices within wireless networks.

SUMMARY

In various embodiments, a system within a wireless network comprises a set of battery-powered device (BPD) nodes within the wireless network, each BPD node in the set of BPD nodes including a memory storing instructions, and a processor coupled to memory that executes the instructions, and a joining BPD node within the wireless network, the joining BPD node including a second memory storing a network management application, and a second processor coupled to the memory that executes the network management application to identify, in a subtree of BPD nodes within the wireless network, the set of BPD nodes as a set of potential parent nodes, filter, based on a set of network optimization criteria, the set of BPD nodes to identify a target parent node in the set of BPD nodes, and transmitting a request message to establish a communications link with the target parent node as a child node, where the target parent node in the set of BPD nodes executes the instructions to receive the request message from the joining BPD node, evaluate data associated with the joining BPD node with a set of acceptance criteria, and upon determining that the joining BPD node meets the set of acceptance criteria, establish the communications link with the joining BPD node, wherein, upon the communications link being established, the joining BPD node is a child node to the target parent node.

In some embodiments, a computer-implemented method for performing node-based operations within a wireless network comprises identifying, in a subtree of battery powered device (BPD) nodes within the wireless network, a set of potential parent nodes, filtering, based on a set of network optimization criteria, the set of potential parent nodes to identify a target parent node, and transmitting, by a joining BPD node within the wireless network, a request message to establish a communications link with the target parent node.

In some embodiments, a computer-implemented method for performing node-based operations by performing the steps of receiving, by a target parent node from a joining battery powered device (BPD) node, a request message to establish a communications link as a child node, evaluating data associated with the joining BPD node with a set of acceptance criteria, and upon determining that the joining BPD node meets the set of acceptance criteria, establishing the communications link with the joining BPD node, wherein the joining BPD node is a child node to the target parent node, or upon determining that the joining BPD node does not meet the set of acceptance criteria, transmitting a response message denying establishment of the communications link with the target parent node.

At least one technical advantage of the disclosed techniques relative to the prior art is that, with the disclosed techniques, a battery-powered device can efficiently join an existing network in a manner that optimizes the efficiency of communications between nodes in the network. In particular, by performing a multi-step filtering and evaluation technique to target a specific node within an existing network as a potential parent, a battery-powered device can efficiently select a specific node from a group of potential nodes, all without computing a complex formula that consumes more processing resources and decreases battery life. Further, by executing the technique to select a parent based on network optimization criteria, a given battery-powered device can automatically join an existing network in a manner that adheres to optimization criteria that is specified by network managers. These technical advantages represent one or more technological improvements over prior-art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

System Overview

Figure 1:
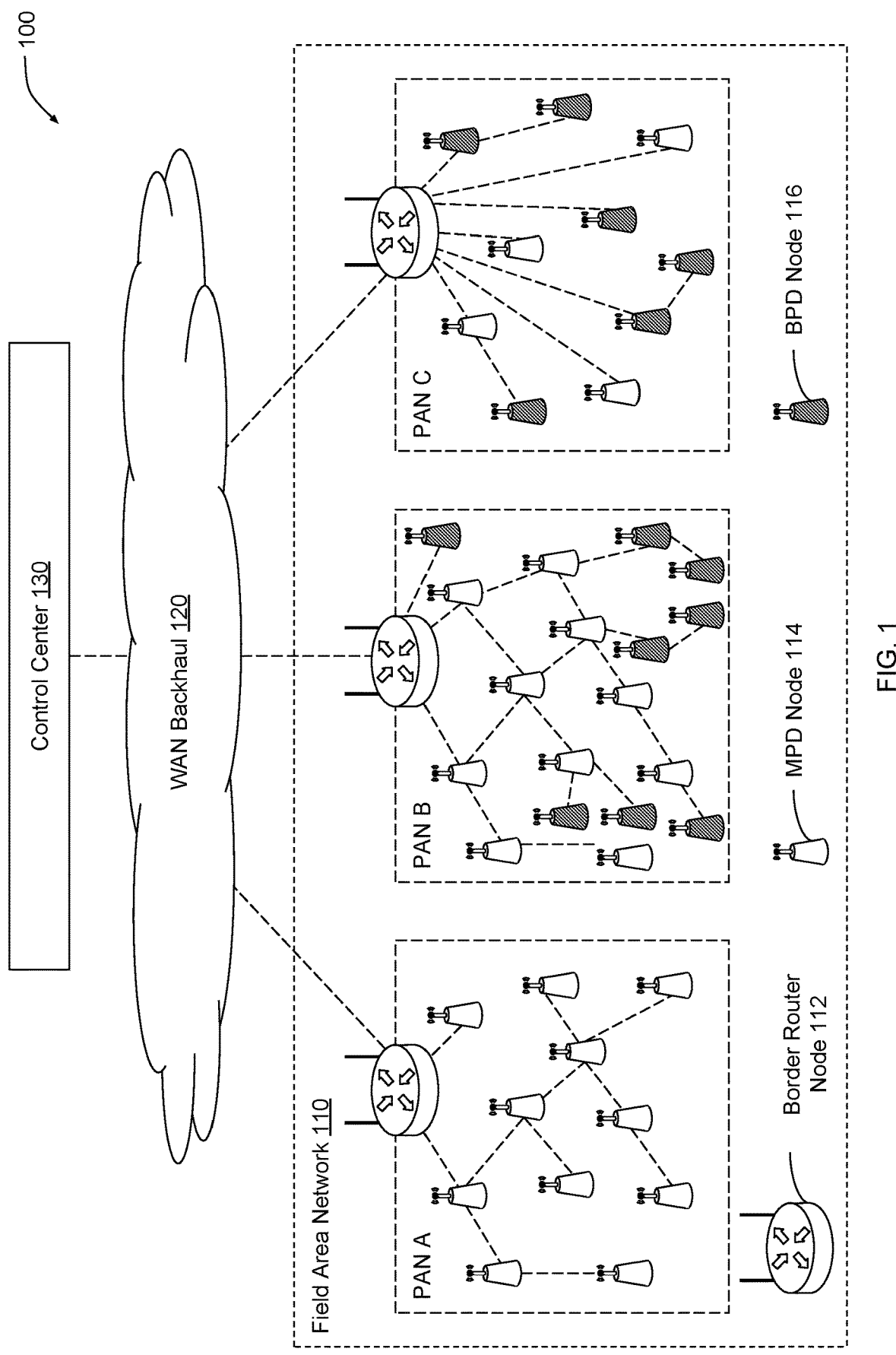
FIG. 1 illustrates a network system configured to implement one or more aspects of the various embodiments.

FIG. 1 illustrates a network system configured to implement one or more aspects of the various embodiments. As shown, network system 100 includes field area network (FAN) 110, wide area network (WAN) backhaul 120, and control center 130. FAN 110 is coupled to control center 130 via WAN backhaul 120. Control center 130 is configured to coordinate the operation of FAN 110.

FAN 110 includes personal area networks (PANs) A, B, and C. PANs A and B are organized according to a mesh network topology, while PAN C is organized according to a star network topology. Each of PANs A, B, and C includes at least one border router node device 112 and one or more mains-powered device (MPD) node devices 114. PANs B and C further include one or more battery-powered device (BPD) node devices 116.

MPD node devices 114 draw power from an external power source, such as mains electricity or a power grid. MPD node devices 114 typically operate on a continuous basis without powering down for extended periods of time. BPD node devices 116 draw power from an internal power source, such as a battery or other local source (e.g., solar cell, etc.). BPD node devices 116 typically operate intermittently and, in some embodiments, may power down for extended periods of time in order to conserve battery power. MPD node devices 114 and/or BPD node devices 116 are configured to gather sensor data, process the sensor data, and communicate data processing results and/or other information to control center 130. Border router node devices 112 operate as access points that provide MPD node devices 114 and BPD node devices 116 with access to control center 130.

Any of border router node devices 112, MPD node devices 114, and/or BPD node devices 116 are configured to communicate directly with one or more adjacent node devices via bi-directional communication links. In various embodiments, a given communication link may be wired or wireless links, although in practice, adjacent node devices of a given PAN exchange data with one another by transmitting data packets via wireless radio frequency (RF) communications. The various node types are configured to perform a technique, known in the art as "channel hopping," in order to periodically receive data packets on varying channels. As known in the art, a "channel" may correspond to a particular range of frequencies. In one embodiment, a node device may compute a current "receive" channel by evaluating a Jenkins hash function that is based on a total number of channels, the media access control (MAC) address of the node device, and/or other information associated with the node device.

In various embodiments, a definition for the channelization of the spectrum for FAN 110 and/or a given operating region (e.g., the North America operating region, the Brazil operating region, etc.) is required in order to enable effective operation of node devices 112, 114, 116. A given operating region or a FAN 110 within a specific operating region has an associated channel plan that defines operating modes and/or operating characteristics (e.g., frequency band, channel spacing, center channel frequency, etc.) that are allowed within the operating region and/or FAN 110. In some embodiments, when a new operating mode is defined within the operating region, a new physical (PHY) layer definition may be added to the channelization definition. In such instances, the additional definition may make the selection by the node device 112, 114, 116 of a specific channel complex, due to the full definition of a given channel growing in complexity.

In various embodiments, one or more components of FAN 110 may incorporate various optimized channelization techniques in order to determine channels that are available for use within an operating region and which a given node device 112, 114, 116 is capable of supporting. Upon determining available channels that the given node device 112, 114, 116 is capable of supporting, the given node device 112, 114, 116 may select at least one of the supported channels to enable communications with other node devices. For example, a given node device 112, 114, 116 may implement various techniques that use, for a given operating region, a combination of defined channel plans and a channel mask (which identifies which channels in a given operating region are used) in order to determine supporting operating modes for the operating region. Upon determining the set of supporting operating modes, a given node device 112, 114, 116 may compare the parameters of a supporting operating mode with the capabilities of the given node device 112, 114, 116 and may then select a supported operating mode of which the given node device 112, 114, 116 has the capability of operating. The given node device 112, 114, 116 may send messages to other node devices within FAN 110 that include a channel mask that corresponds to the selected operating mode.

In various embodiments, each node device 112, 114, 116 within a given PAN may implement a discovery protocol to identify one or more adjacent node devices or "neighbors." In such instances, a given node device 112, 114, 116 that has identified an adjacent, neighboring node device may establish a bi-directional communication link with the neighboring node device. Each neighboring node device may update a respective neighbor table to include information concerning the other node device, including the MAC address of the other node device, as well as a received signal strength indication (RSSI) of the communication link established with that node device. In various embodiments, the neighbor table may include information about one or more communication modes that the neighbor mode is capable of supporting, such as the operating parameters (e.g., data rates, modulation scheme, channel spacing, frequencies supported, etc.) for each of the respective operating modes. In some embodiments, the neighbor table may include the channel plan(s) and/or the channel mask(s) for the operating region in which FAN 110 is located.

In various embodiments, node devices 112, 114, 116 may compute the channel hopping sequences of adjacent node devices in order to facilitate successful transmission of data packets to such node devices. In embodiments where node devices 112, 114, 116 implement the Jenkins hash function, a node device 112 may compute a "current receive" channel of an adjacent node device using the total number of channels, the MAC address of the adjacent node device, and/or a time slot number assigned to a current time slot of the adjacent node device.

Any of the node devices 112, 114, 116 discussed above may operate as a source node device, an intermediate node device, or a destination node device for the transmission of data packets. In some embodiments, a given source node device may generate a data packet and then transmit the data packet to a destination node device via any number of intermediate node devices (in mesh network topologies). In such instances, the data packet may indicate a destination for the packet and/or a particular sequence of intermediate node devices to traverse in order to reach the destination node device. In some embodiments, each intermediate node device may include a forwarding database indicating various network routes and cost metrics associated with each route.

Node devices 112, 114, 116 transmit data packets across a given PAN and across WAN backhaul 120 to control center 130. Similarly, control center 130 transmits data packets across WAN backhaul 120 and across any given PAN to a particular node device 112, 114, 116 included therein. As a general matter, numerous routes may exist which traverse any of PANs A, B, and C and include any number of intermediate node devices, thereby allowing any given node device or other component within network system 100 to communicate with any other node device or component included therein.

Control center 130 includes one or more server machines (not shown) configured to operate as sources for, and/or destinations of, data packets that traverse within network system 100. In various embodiments, the server machines may query node devices within network system 100 to obtain various data, including raw and/or processed sensor data, power consumption data, node/network throughput data, status information, and so forth. The server machines may also transmit commands and/or program instructions to any node device 112, 114, 116 within network system 100 to cause those node devices to perform various operations. In one embodiment, each server machine is a computing device configured to execute, via a processor, a software application stored in a memory to perform various network management operations.

Figure 2:
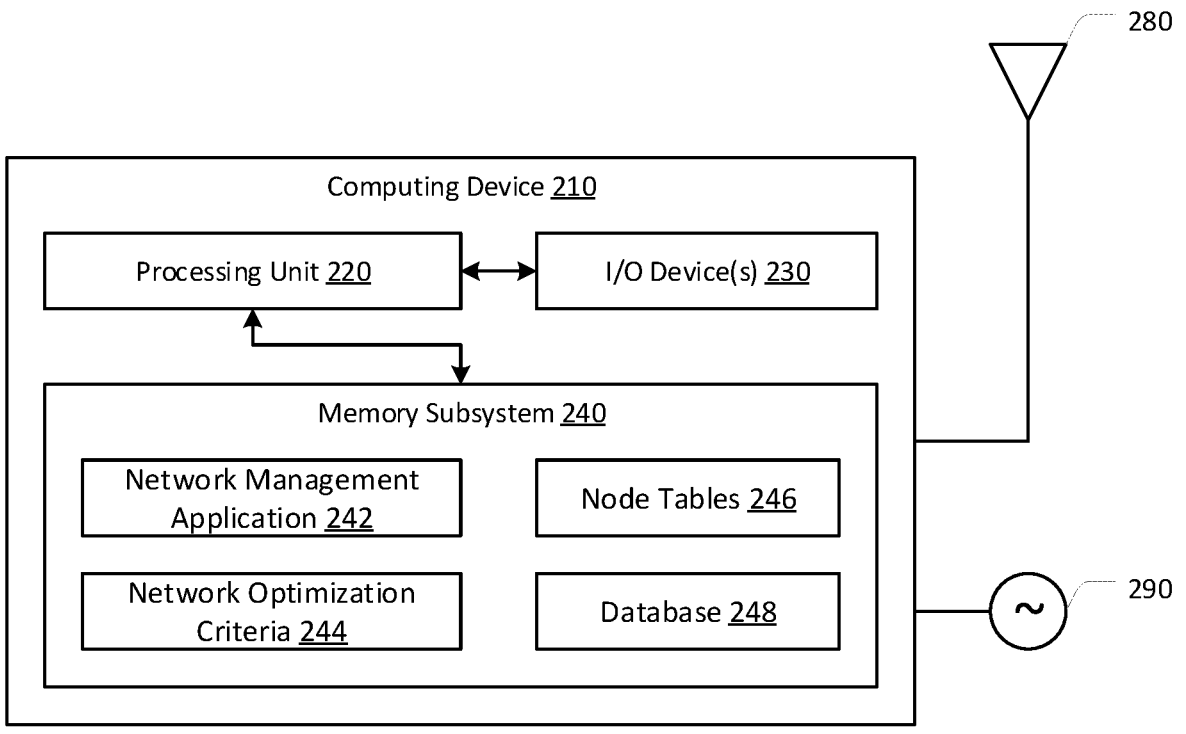
FIG. 2 illustrates a node device configured to transmit and receive data within the network system of FIG. 1, according to various embodiments.

In various embodiments, node devices 112, 114, 116 may likewise include computing device hardware configured to perform processing operations and execute program code. Each node device may further include various analog-to-digital (A/D) converters, digital-to-analog (D/A) converters, digital signal processors (DSPs), harmonic oscillators, transceivers, and/or any other components generally associated with RF-based communication hardware. FIG. 2 illustrates an exemplary node device that may operate within the network system 100.

FIG. 2 illustrates a node device 200 configured to transmit and receive data within the network system 100 of FIG. 1, according to various embodiments. As shown, a node device 200 includes a computing device 210 coupled to a transceiver 280 and an oscillator 290. Computing device 210 coordinates the operations of the node device 200. Transceiver 280 is configured to transmit and receive message data packets across network system 100 using a range of channels and power levels. Oscillator 290 provides one or more oscillation signals according to which the transmission and reception of message data packets can be scheduled. Each node device 200 can further include various analog-to-digital (A/D) and digital-to-analog (D/A) converters, digital signal processors (DSPs), harmonic oscillators, transceivers, and any other components generally associated with RF-based communication hardware (not shown).

Each node device 200 includes computing device hardware configured to perform processing operations and execute program code. The computing device 210 includes a processing unit 220, one or more input/output (I/O) devices 230, and a memory subsystem 240, coupled together. The processing unit 220 may include any hardware configured to process data and execute software applications. In general, the processing unit 220 retrieves and executes programming instructions stored in the memory subsystem 240. I/O devices 230 include devices configured to receive input, devices configured to provide output, and devices configured to both receive input and provide output.

The processing unit 220 can be any technically-feasible form of processing device configured to process data and execute program instructions. The processing unit 220 could be, for example, one or more central processing units (CPUs), DSPs, graphics processing units (GPUs), application-specific integrated circuits (ASICs), field-programmable gate arrays (FPGAs), and/or the like. In some embodiments, the processing unit 220 can include a real-time clock (RTC) (not shown), according to which the processing unit 220 maintains an estimate of the current time. The processing unit 220 is included to be representative of a single processor, multiple processors, a single processor having multiple processing cores, and the like. In operation, the processing unit 220 is the master processor of the node device 200, controlling and coordinating operations of other system components.

The memory subsystem 240 stores software applications and data for use by the processing unit 220. The memory subsystem 240 can be implemented by any technically-feasible storage medium. The memory subsystem 240 stores software programs including, without limitation, a network management application 242, network optimization criteria 244, one or more node tables 246, and a database 248. The network management application 242 includes program instructions that, when executed by the processing unit 220, performs any one or more of the computer-based techniques described herein.

In various embodiments, the network management application 242 can interface with the transceiver 280 to coordinate the transmission and reception of message data packets across the network system 100 based on timing signals generated by the oscillator 290. The database 248 can include various data and data structures retrieved by and/or stored by the network management application 242. For example, the database 248 could include node data (e.g., security keys, media access control (MAC) addresses of neighboring node devices, etc.) and/or network data (e.g., network performance metrics, cost metrics, etc.). In various embodiments, the one or more node tables 246 may be stored in the database 248.

In various embodiments, the node device 200 can use the network management application 242 to connect and communicate with other node devices 112, 114, 116 in the FAN 110. For example, the node device 200 could execute the network management application 242 in order to connect and communicate with an BPD node 116 within the FAN 110. When joining the FAN 110, the node device 200 (discovering node) can use the network management application 242 to perform a discovery process/function with one or more BPD nodes 116 (potential parent nodes) to discover a group of BPD nodes 116. The network management application 242 can identify a specific BPD node 116 as a target parent node and connect to the specific BPD node 116. In some embodiments, the network management application 242 may produce and/or maintain one or more node tables 246 (e.g., a neighborhood table (NHT), a potential parent table (PPT), a discovery response beacon table, etc.) in order to assist in the managing of connections to BPD nodes in a given BPD subtree.

The network optimization criteria 244 includes one or more sets of criteria that the network management application 242 uses to determine a specific BPD node to which the node device 200 is to establish a connection. In various embodiments, the network optimization criteria 244 may include a hierarchy of distinct criterion, where each criterion is associated with a specific metric or set of metrics. In such instances, the network management application 242 may use each criterion in a multi-step filtering process in order to identify, from a set of neighboring nodes, one specific node as a target parent.

In one example, the network optimization criteria 244 could be a battery-optimization set that also balances the number of BPD nodes 116 that have children ("B_EQ"). The B_EQ criteria could include a first criterion that analyzes a load metric (e.g., a load size indicator (LSI) value) of each respective potential node and selects the potential with the lowest value. When there are two or more potential nodes with the same value (e.g., $LSI_1=LSI_2$), then the network management application 242 could use a second criterion in the battery-optimization set that analyzes the respective hop counts of the remaining potential nodes, selecting the specific node having the lowest number of hops (e.g., minimizing a hop count value).

In some embodiments, the network management application 242 may randomly select a specific BPD node 116 from a set of potential nodes upon analyzing each of the network optimization criteria 244. For example, the network management application 242 could determine that, upon analyzing both the LSI values and the hop count values of potential nodes, at least two potential nodes remain. In such instances, the network management application 242 could then randomly select a BPD node 116 from the two or more potential nodes as the target parent node.

In another example, the network optimization criteria 244 could be a latency-optimization set that also does not balance the number of BPD nodes 116 that have children ("L_UNEQ"). In such instances, a network manager could configure the network management application 242 to use the L_UNEQ set where specific nodes have larger batteries and can handle larger loads. Further, focusing the number of children onto fewer nodes limit the number of nodes that need maintenance at a given time (e.g., replacing batteries for two main nodes in lieu of replacing batteries for ten smaller nodes).

The L_UNEQ criteria could include a first criterion that analyzes the hop count value that indicates the respective hop counts of the potential nodes, where the node device 200 selects as a target parent node the specific potential node having the lowest number of hops. When two or more potential nodes have the same hop count value, then the network management application 242 could use a second criterion in the latency-optimization set that analyzes the LSI value of each of the remaining potential nodes selects the potential node having the highest value. When there are two or more potential nodes with matching load values, the network management application 242 could randomly select a specific BPD node 116 from the two or more potential nodes.

In various embodiments, the network optimization criteria 244 may include other combinations of criteria to filter a set of neighboring nodes. For example, the network optimization criteria 244 could include criteria that focus on reducing communications latency and balancing child nodes among nodes in the network 110 ("L_EQ"). Alternatively, the network optimization criteria 244 could include criteria that focus on maximizing battery life and focusing child nodes to a few parent nodes in the network 110 ("B_UNEQ"). Other criteria, such as communications frequency, failure rate, etc., could be included in the network optimization criteria 244 as well.

Node tables 246 include one or more tables that the network management application 242 uses to manage connections to other nodes within the network 110. In various embodiments, the network management application 242 may add or remove entries that are included in a given node table 246 in order to manage communications with one or more nodes in network 110. In various embodiments, the node tables 246 may include a potential parent table (PPT), a discovery beacon response table, and/or a neighborhood table (NHT). In some embodiments, the network management application 242 may retrieve information from one node table to populate entries in a different node table. For example, the network management application 242 could initially populate the PPT with each entry included in the NHT and could remove those entries from the PPT that do not meet the criteria defined by the network optimization criteria 244.

Database 248 includes various data internally stored by the computing device 210. In some embodiments, the database 248 could store various node data (e.g., sensor data, computed metrics, selections for parent nodes, etc.) and/or network data (e.g., network performance metrics, region information, communication protocol information, etc.). In some embodiments, one or more of the network optimization criteria 244 and/or the node tables 246 may be stored in the database 248.

Targeted Parent Selection by a Battery-Powered Device

Figure 3:
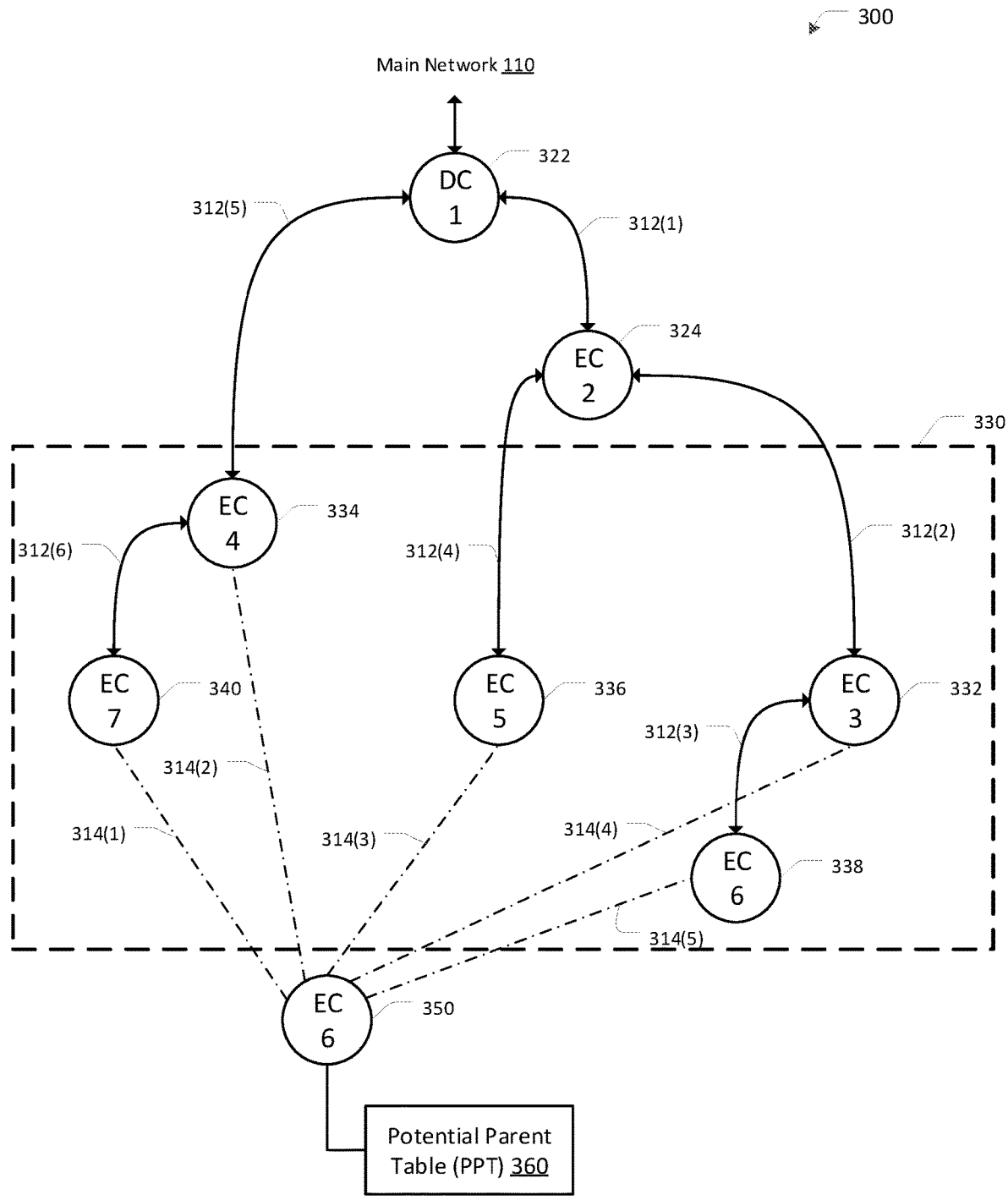
FIG. 3 illustrates a BPD subtree configured to operate within the network system of FIG. 1, according to various embodiments.

FIG. 3 illustrates a BPD subtree 300 configured to operate within the network system 100 of FIG. 1, according to various embodiments. As shown, a joining node 350 is joining the BPD subtree 300. The BPD subtree 350 includes a plurality of connected BPD nodes 322-340. The BPD nodes 322-340 are configured to communicate directly with one or more adjacent nodes via bi-directional communication links 312 (e.g., 312(1), 312(2), etc.). The joining BPD node 350 includes a potential parent table (PPT) 360 that includes entries corresponding to a subset of the BPD nodes 322-340, from which the joining BPD node 350 selects a target parent node.

The BPD subtree 300 includes a single root node (the direct-connected node 322) and one or more child nodes (e.g., 324-340) within the network 110. In operation, the joining BPD node 350 generates a PPT 360 that lists a group of BPD nodes within the BPD subtree 300 that are identified as potential parent nodes 330 (e.g., the BPD nodes 332, 334, 336, 338, 340). Each potential parent node 330 has a potential communications link 314 (e.g., the potential communications links 314(1), 314(2), etc.) with the joining BPD node 350. In various embodiments, the network management application 242 included in the joining BPD node 350 may use the network optimization criteria 244 to evaluate various node data associated with each of the potential parent nodes 330 and, based on the evaluation, select a specific BPD node (e.g., BPD node 332) from the potential parent nodes 330 as a target parent node. Once the joining BPD node 350 selects the specific BPD node 332 as the target parent node, the joining BPD node 350 communicates with the specific BPD node 332 in order to establish the potential communications link 314(4) as an existing bi-directional communications link.

The BPD subtree 300 can be represented as a multi-hop EFC (MESH) sub-destination-oriented Directed Acyclic Graph (DODAG) of the network 110. The BPD subtree 300 is attached to at least one MPD node 114 of the network 110. The BPD subtree 300 includes a single root BPD node, referred to herein as the direct-connected (DC) node 322, and one or more descendant BPD nodes of the DC node (e.g., nodes 324-340). Each descendant BPD node is connected to the DC node 322, or to another descendant BPD node within the BPD subtree 300. Therefore, a descendant BPD node can comprise a child of the DC node 322, grandchild of the DC node 322, great-grandchild of the DC node 322, and so forth. A descendant BPD node of the DC node 322 is referred to herein as an extended child (EC) node of the DC node 322.

Each BPD node 322-340 includes computing device hardware configured to perform processing operations and execute program code. In various embodiments, one or more BPD nodes 322-340 in the BPD subtree 300 may include a set of subtree parameters that define the structure of the BPD subtree 300 within the network 110. For example, the set of subtree parameters could specify a maximum number of nodes permitted within each subtree, a maximum number of node hops permitted within each subtree, and a maximum number of parent nodes permitted for each node in the subtree. In some embodiments, the set of subtree parameters may include one or more BPD-specific parameters that are designed specifically for power efficiency, where one or more of the subtree parameters may be based on the battery power characteristics of one or more of the BPD nodes 322-340. For example, a set of subtree parameters could be based on the battery capacity and/or predicted battery life of a battery power source of a given BPD node 322-340.

In various embodiments, the DC node 322 may manage the BPD subtree 300 in accordance with the set of subtree parameters. In particular, the DC node 322 ensures that the BPD subtree 300 complies with the specified parameters, such as a maximum number of nodes for a subtree, a maximum number of node hops for a subtree, and a single parent requirement. In some embodiments, the DC node 322 may generate and maintain a routing table (that is included in the node tables 246) to assist in the managing of the BPD subtree 300 and the performance of the various functions, such as discovery and communications functions.

The bi-directional communication links 312 (e.g., links 312(1)-312(6)) included in the BPD subtree 300 can be wired or wireless links that allow data exchange, such as wireless radio frequency (RF) communications, wireless (Wi-Fi) network, Bluetooth, Wireless USB, among others. In various embodiments, a given BPD node may establish a bi-directional communication link 312 with a single parent node. For example, the EC node 338 may establish the bi-directional communication link 312(3) with its parent node, EC node 332.

In various embodiments, when joining the BPD subtree 300, the joining BPD node 350 may perform various operations to discover neighboring nodes included in the BPD subtree 300 and may determine a set of potential parent nodes 330. In some embodiments, the joining BPD node 350 may generate entries for each potential parent node 330 in a potential parent table (PPT) 360. For example, the joining BPD node 350 could perform an affiliation process as a part of the discovery function in order to affiliate the joining BPD node 350 with the DC node 322 and/or discover one or more BPD nodes in the BPD subtree 300. Once the joining BPD node 350 identifies one or more potential BPD nodes 330 during the discovery process, the joining BPD node 350 adds entries into the PPT 360, where each entry corresponds to a potential BPD node 330. The network management application 242 in the joining BPD node 350 could then apply the network optimization criteria 244 to filter one or more potential parent nodes 330 from the PPT 360 until choosing a single potential BPD node as the target parent node.

Figure 4:
FIG. 4 is a conceptual diagram of a potential parent table (PPT) generated by a BPD node of FIG. 3, according to various embodiments.

FIG. 4 is a conceptual diagram of a potential parent table (PPT) 400 generated by a BPD node 350 of FIG. 3, according to various embodiments. As shown, the PPT 400 includes a node identifier (ID) field 402, an average received strength signal indicator (RSSI) field 406, a load size indicator (LSI) field 408, a hop count field 410, and entries 420-428 that correspond to potential BPD nodes 330 (e.g., BPD nodes 332, 334, 336, 338, 340) in the BPD subtree 300.

In various embodiments, the network management application 242 in the joining BPD node 350 may manage the PPT 400 by adding and/or removing entries 420-428. For example, the network management application 242 could initially generate the PPT 400 with entries 420-428. The network management application 242 could populate the fields 402-410 with node data received from the control center 130, the DC node 322, and or the individual BPD nodes 332-340. The network management application 242 could then use the network optimization criteria 244 and/or additional criteria to evaluate the node data for the respective BPD nodes 332-340 and filter the entries 420-428 included in the PPT 400 until a single entry (e.g., entry 424) remains.

Upon identifying the single remaining entry, the network management application 242 uses the node ID value of the entry to identify the corresponding BPD node in the BPD subtree as the target parent node and attempts to join the BPD subtree by connecting to the target parent node. In some embodiments, the target parent node rejects the joining BPD node 350. In such instances, the network management application 242 may remove the rejecting BPD node from the PPT 400 and may repeat the filtering process to identify a specific BPD node based on the remaining entries of the PPT 400.

The node ID field 402 of a particular entry indicates the identifier for a particular node within the BPD subtree 300. In some embodiments, the node ID field 402 for the BPD subtree 300 may differ from an identifier within the network 110 and/or a universal identifier. For example, as shown in entry 424, the BPD node 332 could have a node ID value of "3" within the BPD subtree 300 while having a different device ID (not shown) within the network 110.

The average RSSI field 406 indicates an estimated measure of power for a particular time period. In various embodiments, the RSSI of a given device is an estimated measure of power level that a BPD node is receiving from an access point or router (e.g., a border router node 112). Lower RSSI values generally indicate a weaker signal that a given BPD node receives. In some embodiments, the network management application 242 may compare respective average RSSI values of BPD nodes in order to identify the one or more BPD nodes that have the lowest average RSSI value and therefore most-likely to have the lowest communications latency.

The LSI field 408 indicates an estimated load size for a particular BPD node. In various embodiments, the load size indicator is a metric that indicates an estimated load carried by a particular BPD node. In some embodiments, the LSI value may be a relative metric that indicates the relative network traffic loads of respective BPD nodes. In some embodiments, the LSI value may be the power load pulled from the battery source, indicating power consumption of the particular BPD node. In such instances, the network management application 242 may compare respective LSI loads in order to identify the one or more BPD nodes having the minimum LSI value (where the network optimization criteria 244 emphasizes equalized load balancing) or the maximum LSI value (where the network optimization criteria 244 emphasizes un-equalized load balancing).

The hop count field 410 indicates the number of hops that a particular BPD node has from itself to the DC node 322. In various embodiments, a hop count value for a given BPD node is equal to the number of devices (including the DC node 322) that a message travels through when traversing the BPD subtree 300. Generally, a larger hop count value corresponds to a larger communications latency experienced by the BPD node due to the larger quantity of devices that handle a message. In some embodiments, the network management application 242 compares the hop count values of the respective BPD nodes in order to select a specific BPD node that has the lowest number of hops to the DC node 322.

In various embodiments, the PPT 400 may include other metrics associated with network optimization criteria 244. For example, such metrics may include an average reboot time, an IPv4 addressable route, an IPv6 addressable route, a battery-backed route, and/or security credential associated with the potential parent node. In such instances, the network management application 242 may use one or more of the additional metrics when selecting a specific node as a potential parent. For example, the network management application 242 may select a specific parent node in response to determining that the joining BPD node 350 and the potential parent node have common security credentials.

In various embodiments, the network management application 242 may use a specific set of network optimization criteria 244 that emphasizes a certain criterion over another criterion, or multiple criteria. For example, a "L_EQ" set of network optimization criteria 244 could emphasize communications latency by initially evaluating hop count values of BPD nodes before evaluating LSI values in order to equalize loads between BPD nodes. In another example, a "B_UNEQ" could emphasize power consumption by initially evaluating LSI values (and attempt to provide un-equalized loads by identifying the BPD nodes with the largest LSI values and largest load capacities) before evaluating hop count values of the BPD nodes.

Additionally or alternatively, the network management application 242 may initially perform pre-selection operations by evaluating one or more criteria before evaluating the criteria specified by the network optimization criteria. In such instances, the network management application may identify a specific BPD node from the potential BPD nodes 330 before using the network optimization criteria 244. For example, the network management application 242 could perform pre-selection operations of identifying the potential BPD node having the highest average RSSI value. In such instances, the network management application 242 could identify a single BPD node having a highest average RSSI value as the target parent node.

In some embodiments, the network management application 242 may use the pre-selection process to generate a filtered set of BPD nodes. For example, the network management application 242 may compare the average RSSI values of the entries 420-428 to a threshold RSSI value and may generate a filtered set of BPD nodes based on the BPD nodes that had average RSSI values above the threshold RSSI value. Additionally or alternatively, the network management application 242 identifies two or more BPD nodes with the same average RSSI value. In such instances, the network management application 242 may then perform a parent selection process by using the network optimization criteria 244 to evaluate the filtered set of BPD nodes to ultimately select a single BPD node as the target parent node.

Parent Association Between Battery-Powered Devices

Figure 5:
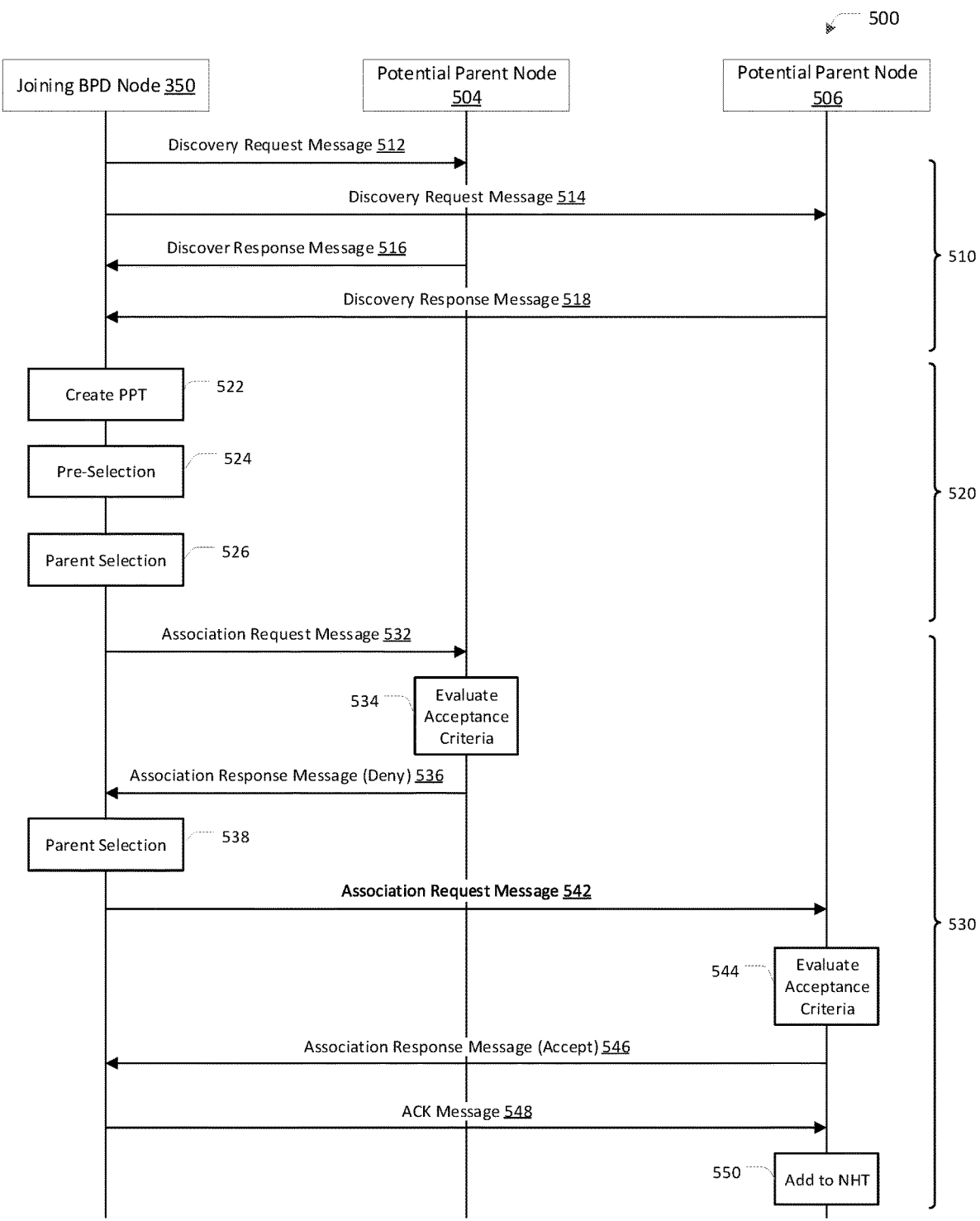
FIG. 5 illustrates an interaction diagram showing interactions between various components of the example BPD subtree of FIG. 3, according to various embodiments.

FIG. 5 illustrates an interaction diagram 500 showing interactions between various components of the example BPD subtree 300 of FIG. 3, according to various embodiments. One or more components of the BPD subtree 300 and/or the joining BPD node 350 may perform various operations to identify a target parent node and associate the joining BPD node 350 to the target parent node.

During the discovery process 510, the joining BPD node 350 identifies one or more neighboring nodes in the BPD subtree 300 as potential parent nodes 330. In various embodiments, the joining BPD node 350 may transmit one or more discovery request messages 512, 514 to one or more potential parent nodes 504, 506. For example, the joining BPD node 350 could transmit the discovery request messages 512, 514 as discovery beacons messages during a discovery window. In one example, the discovery windows could be configured to occur once a day or twice a day. In some embodiments, the discovery request messages 512, 514 may include identifying information for the joining BPD node 350, such as a node ID, MAC address, and so forth. Additionally or alternatively, the discovery request messages may indicate a response window for the potential parent nodes 504, 506 to send a response message to the joining BPD node 350.

The respective potential parent nodes 504, 506 receive the respective discovery request messages 512, 514 and respond by transmitting discovery response messages 516, 518 to the joining BPD node 350. In some embodiments, the discovery response messages 516, 518 may be beacon messages that respond to the discovery beacon messages that the joining BPD node 350 sent during the discovery window. In such instances, the joining BPD node 350 may listen for beacon messages, and the potential parent nodes 504, 506 may transmit the discovery response messages 516, 518 during a subsequent response window. In some embodiments, the discovery response message 516, 518 includes the node ID and other information associated with the potential parent node 504, 506. For example, the potential parent node 504 could send a discovery response message 514 that includes the node ID value of the potential parent node 504, a MAC address for the potential parent node 504, and other node data (e.g., hop count value, average RSSI value, LSI value, etc.). The joining BPD node 350 receives the discovery response messages 516, 518 during the response window from each of the potential parent nodes 504, 506. In some embodiments, the joining BPD node 350 may optionally respond to receiving the discovery response messages 516, 518 by initiating a time synching procedure with each of the potential parent nodes 504, 506 to link/synch with each of the respective potential parent nodes 504, 506.

During the parent selection process 520, the joining BPD node 350 performs various actions to filter the group of potential parent nodes 504, 506 to a single target parent node to which the joining BPD node 350 attempts to associate. Upon receiving the discovery response messages 516, 518, the joining BPD node 350 performs various actions 522 to generate a potential parent table 360. In various embodiments, the network management application 242 in the joining BPD node 350 performs various actions to generate a PPT 360 that includes entries corresponding to each potential parent node 504, 506. In some embodiments, the joining BPD node 350 may maintain a neighborhood table (NHT) that includes one or more neighboring nodes, including one or more BPD nodes in the BPD subtree 300, one or more MPD nodes 114 in the network 110, and/or one or more border router nodes in the network 110. In such instances, the network management application 242 could generate entries in the PPT 360 for each BPD node in the neighborhood table that the network management application 242 determines are within a threshold range of the joining BPD node 350.

Upon generating the PPT 360, the network management application 242 may optionally perform various pre-selection operations 524 to filter the entries in the PPT 360 to a subset of potential parent nodes. In various embodiments, the network management application 242 may initially perform the pre-selection operations 524 by evaluating the entries of the PPT 360 against one or more criteria before evaluating the entries against the criteria specified by the network optimization criteria 244. In such instances, the network management application 242 may identify a specific potential parent node from the group of initially-identified potential parent nodes before using the network optimization criteria 244. For example, the network management application 242 could perform the pre-selection operations 524 of identifying the potential parent node that has the highest average RSSI value. In such instances, the network management application 242 could identify, from the group of potential parent nodes, a single BPD node having the highest average RSSI value as the target parent node.

The network management application 242 performs one or more parent selection operations 526 on the set of potential parent nodes listed in the PPT 360. Alternatively, in some embodiments, the network management application 242 may optionally filter the initial list of potential parent nodes in the PPT 360 by performing the pre-selection operations 524; in such instances, the network management application 242 performs the parent selection operations 526 on the filtered subset of the potential parent nodes generated by the pre-selection operations 524.

When performing the parent selection operations 526, the network management application 242 loads a set of network optimization criteria 244 stored in the memory subsystem 240 of the joining BPD node 350. In some embodiments, the joining BPD node 350 may be configured to store a single set of network optimization criteria 244 (e.g., a network manager installs a single set of network optimization criteria 244, such as the "B_EQ" set of optimization criteria). In such instances, the network management application 242 retrieves the set of network optimization criteria 244 from memory. Alternatively, the joining BPD node 350 may be configured to store multiple network optimization criteria 244 (e.g., B_EQ 244(1), B_UNEQ 244(2), L_EQ 244(3), L_UNEQ 244(4)). In such instances, the joining BPD node 350 may be configured to have only one active network optimization criteria 244 at a given time. The network management application 242 may then retrieve the active network optimization criteria 244 (e.g., L_UNEQ 244(4)) from the memory subsystem 240.

Upon loading the active network optimization criteria 244, the network management application 242 the entries in the PPT 360 against the criteria specified by the network optimization criteria 244. In various embodiments, the network optimization criteria 244 specifies an order of separate criteria, corresponding to an order of importance, that the network management application 242 is to compare in order to filter the set of entries in the PPT 360 down to a single entry that the network management application identifies as the target parent node.

For example, the network management application 242 could apply the B_EQ network optimization criteria 244 by first evaluating the LSI values of the entries in the PPT 360. The network management application 242 identifies the specific potential parent node having the lowest LSI value as the target parent node. Otherwise, when the network management application 242 identifies two or more entries in the PPT 360 having the same LSI value (e.g., $LSI_1 = LSI_2$), then the network management application 242 uses a second criterion, where the network management application 242 compares the respective hop count values of the remaining potential parent nodes 504, 506, and selects the specific parent node (e.g., the potential parent node 504) having the lowest number of hops to the DC node 322 at the target parent node.

During the parent association process 530, the joining BPD node 350 sends an association request message 532 to the target parent node. In various embodiments, upon identifying a single potential parent node (e.g., the potential parent node 504) as the target parent node, the joining BPD node 350 sends an association request message 532 to the potential parent node 504 to join the BPD subtree 300 as a child to the potential parent node 504. In some embodiments, the joining BPD node 350 may send the association request message 532 in response to a connection message optionally sent by the potential parent node 504 (not shown).

In some embodiments, the association request message 532 may include node data associated with the joining BPD node 350. Additionally or alternatively, the association request message 532 may be a security request message that the joining BPD node 350 sends in order to get security information (e.g., a security key update) from the BPD subtree 300. In some embodiments, the association request message 532 may be an affiliation request message that is processed both by the potential parent node 504 and the DC node 322. In such instances, the potential parent node 504 forwards the affiliation request message to the DC node 322, and both the potential parent node 504 and the DC node 322 may evaluate various acceptance criteria to determine whether the potential parent node 504 is to accept the joining BPD node 350 as a child node.

Upon receiving the association request message 532, the potential parent node 504 performs various actions 534 to evaluate acceptance criteria against the node data provided by the joining BPD node 350. In various embodiments, the network protocol may specify various parameters associated with the BPD subtree 300, including overall subtree parameters (e.g., each BPD node in the BPD subtree 300 can be attached to only a single parent node and cannot have multiple parent nodes). In such instances, one or both of the potential parent node 504 and the DC node 322 may determine whether the joining BPD node 350 connecting to the potential parent node 504 as a child would violate any of the specified parameters for the BPD subtree 300.

In some embodiments, the potential parent node 504 determines whether the joining BPD node 350 is listed in a stored node table 246, such as a neighborhood table and a discovery beacon response table; in such instances, the potential parent node 504 may only accept the joining BPD node 350 when the joining BPD node 350 includes an entry in at least one node table 246. Additionally or alternatively, the potential parent node 504 may evaluate whether the LSI value of the potential parent node 504 and the LSI values of each parent node to the potential parent node (e.g., parent, grandparent, etc. up to the DC node 322) are all below a maximum load threshold ("MaxLSI"). In such instances, the potential parent node 504 may only accept the joining BPD node 350 as a child upon determining that each respective LSI value falls below the maximum load threshold. In some embodiments, the potential parent node 504 may evaluate multiple criteria to determine whether to accept the joining BPD node 350 as a child node to the potential parent node 504. For example, the potential parent node 504 could reject the joining BPD node 350 if either the joining BPD node 350 is not listed in the node table 246, or the LSI value of the potential parent node 504 exceeds the maximum load threshold.

Upon evaluating the acceptance criteria, the potential parent node 504 may transmit an association response message 536 that indicates a denial of the request to join the BPD subtree 300 as a child node to the potential parent node 504. In various embodiments, upon the potential parent node 504 and/or the DC node 322 processing the acceptance criteria and determining that the joining BPD node 350 is not to connect to the potential parent node 504 as a child, the potential parent node 504 sends an association response message indicating that the request for pairing is denied. In some embodiments, the potential parent node 504 may remove the entry for the joining BPD node 350 from the neighborhood table included in the node tables 246.

If the joining BPD node 350 receives the association response message 536 indicating a denial, the network management application 242 in the joining BPD node 350 may perform additional pre-selection operations and/or parent selection operations 538 to select a new target parent node. In various embodiments, the joining BPD node 350 may respond to the association response message 536 by removing the entry for the potential parent node 504 from the PPT 360 and may reevaluate the remaining entries in the PPT 360 to identify a new specific potential parent node (e.g., the potential parent node 506) as the new target parent node.

Upon identifying the new target parent node, the joining BPD node 350 sends a separate association request message 542 to the potential parent node 506. In various embodiments, the association request message 542 may be similar to the association request message 532 and may contain similar information about the joining BPD node 350. Upon receiving the association request message 542, the potential parent node 506 performs various actions 544 to evaluate acceptance criteria against the node data provided by the joining BPD node 350. The acceptance criteria that the potential parent node 506 reviews may be the same as the acceptance criteria that the potential parent node 504 reviewed, but the results may differ. For example, the potential parent node 506 could determine that the LSI value of the potential parent node 506 and the LSI values of each parent node to the potential parent node 506 (e.g., parent, grandparent, etc. up to the DC node 322) are all below a maximum load threshold. The potential parent node 506 could then accept the joining BPD node 350 upon determining that the joining BPD node 350 is listed in the node table 246 and the LSI values of the potential parent node 506 and its parents are all below the maximum load threshold.

Upon evaluating the acceptance criteria, the potential parent node 506 may transmit an association response message 546 that indicates an acceptance of the request to join the BPD subtree 300 as a child node to the potential parent node 506. In various embodiments, upon the potential parent node 506 processing the acceptance criteria and determining that the joining BPD node 350 can connect to the potential parent node 506 as a child, the potential parent node 506 sends an association response message indicating that the request for pairing is accepted. In some embodiments, the potential parent node 506 may include security information, such as the requested security key. In such instances, the potential parent node 506 may send a separate request to a security agent within the network 110 for the applicable security information and may forward the security information to the joining BPD node 350.

If the joining BPD node 350 receives the association response message 546 indicating an acceptance, the network management application 242 in the joining BPD node 350 sends an acknowledgement message 548 to the potential parent node 506, where the acknowledgement message 548 indicates that the joining BPD node 350 received the association response message 546 and will establish a bi-directional communication link 312 with the potential parent node 506.

When the potential parent node 506 receives the acknowledgement message 548, the potential parent node may then respond by optionally performing various actions 550 to add an entry for the joining BPD node 350 to its neighborhood table. In some embodiments, the joining BPD node 350 may already have an entry in the neighborhood table of the potential parent node 506. In such instances, the potential parent node 506 may refrain from modifying the neighborhood table. Alternatively, the potential parent node 506 may only have an entry for the joining BPD node 350 in a discover beacon response table. In such instances, the potential parent node 506 may add an entry for the joining BPD node 350 in the neighborhood table for the potential parent node 506 as well.

Figure 6:
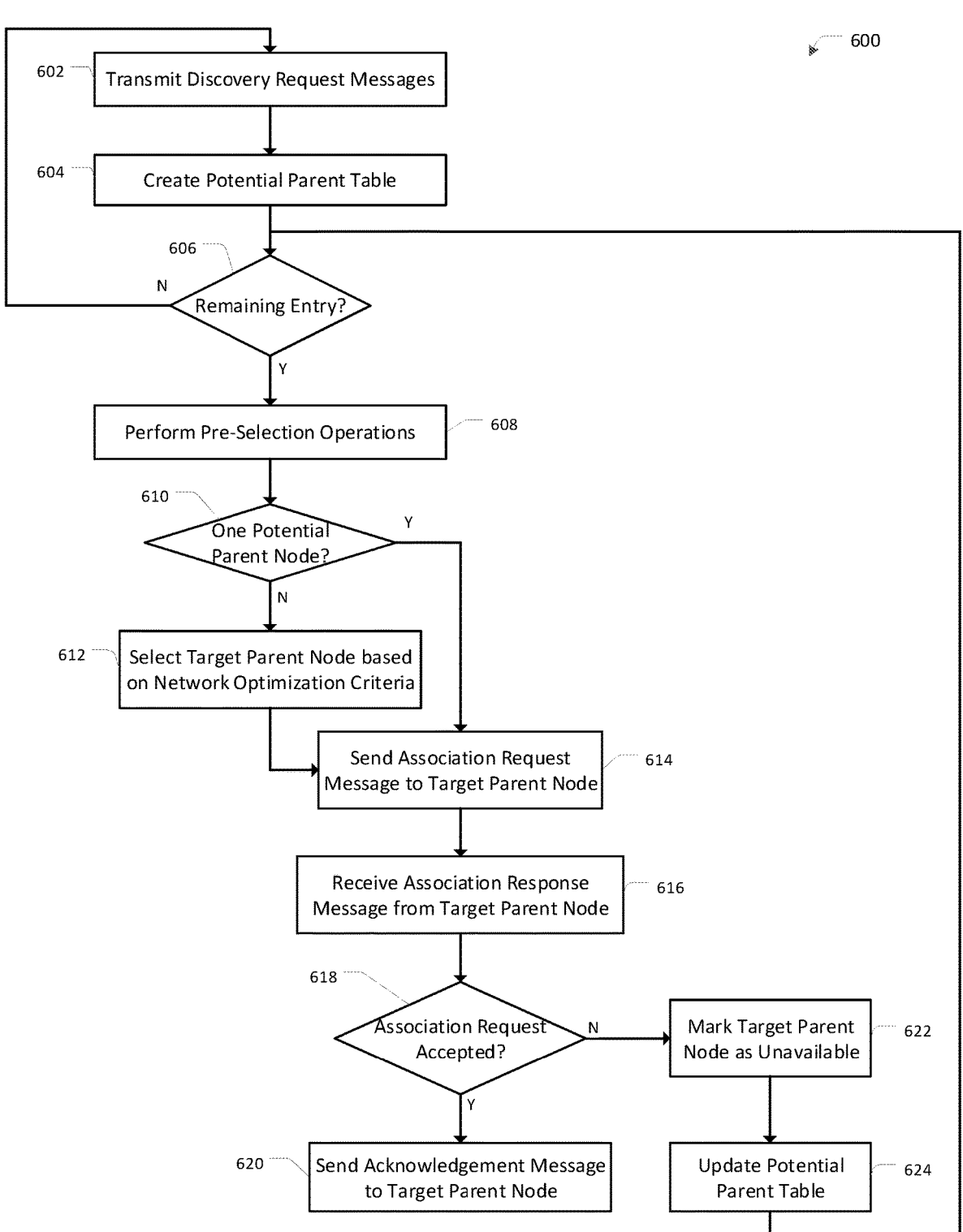
FIG. 6 is a flow diagram of method steps for associating with a target parent node device from a set of potential node devices, according to various embodiments.

FIG. 6 is a flow diagram of method steps for associating with a target parent node device from a set of potential node devices, according to various embodiments. Although the method steps are described in conjunction with the systems of FIGS. 1-5, persons skilled in the art will understand that any system can be configured to perform the method steps in any order.

As shown, a method 600 begins at step 602, where the joining BPD node 350 identifies one or more neighboring nodes in the BPD subtree 300 as potential parent nodes 330. In various embodiments, the joining BPD node 350 may, during a discovery window, transmit one or more discovery request messages to one or more potential parent nodes within a BPD subtree 300. For example, the joining BPD node 350 could transmit the discovery request messages 512, 514 as discovery beacons messages during the discovery window. In some embodiments, the discovery request messages 512, 514 may include identifying information for the joining BPD node 350, such as a node ID, MAC address, and so forth. Additionally or alternatively, the discovery request messages may indicate a response window for the potential parent nodes in the BPD subtree 300 to send a response message to the joining BPD node 350.

At step 604, the joining BPD node 350 generates a potential parent table 400 with entries 420-428 corresponding to the potential parent nodes 330 within the BPD subtree 300. In various embodiments, the joining BPD node 350 receives one or more discovery response messages sent by one or more potential parent nodes in the BPD subtree 300 to the joining BPD node 350. In some embodiments, the discovery response messages may be beacon messages that respond to the discovery beacon messages that the joining BPD node 350 sent during the discovery window. In such instances, the joining BPD node 350 may listen for beacon messages, and the potential parent nodes 330 may transmit the discovery response messages 516, 518 during a subsequent response window. In some embodiments, the discovery response message 516, 518 includes the node ID and other information associated with the potential parent node 330 (e.g., hop count value, average RSSI value, LSI value, etc.). The joining BPD node 350 receives the discovery response messages 516, 518 during the response window from each of the potential parent nodes 330.

In various embodiments, the network management application 242 in the joining BPD node 350 may generate a PPT 400 that includes entries 420-428 corresponding to the discovery response messages 516, 518 sent by each potential parent node 330. In some embodiments, the joining BPD node 350 may maintain a neighborhood table (NHT) that includes one or more neighboring nodes, including one or more BPD nodes 322-340 in the BPD subtree 300, one or more MPD nodes 114 in the network 110, and/or one or more border router nodes in the network 110. In such instances, the network management application 242 could generate entries 420-428 in the PPT 400 for each BPD node in the neighborhood table that the network management application 242 determines are within a threshold range of the joining BPD node 350 (e.g., received discovery response messages 516, 518 within a threshold time period).

At step 606, the joining BPD node 350 determines whether any applicable entries remain in the PPT 400. In various embodiments, the network management application 242 may optionally perform various steps to filter the entries in the PPT 400 until a single target parent node is identified. In such instances, the network management application 242 may perform a loop of steps to analyze entries in the PPT 400 in order to identify and connect to a single target parent node. When the network management application 242 determines that no applicable entries in the PPT 400 remain (indicating no potential parent nodes 330), the joining BPD node 350 may return to step 602 to discover other BPD nodes as potential parent nodes 330. Otherwise, the network management application 242 identifies at least one entry in the PPT 400 and proceeds to step 608.

At step 608, the joining BPD node 350 performs a pre-selection step on the entries included in the PPT 400. In various embodiments, the joining BPD node 350 may perform a pre-selection step to filter the entries in the PPT 400 to a subset of potential parent nodes. In some embodiments, the network management application 242 may initially perform the pre-selection step by evaluating the entries 420-428 of the PPT 400 against one or more criteria before evaluating the entries against the criteria specified by the network optimization criteria 244. For example, the network management application 242 could perform the pre-selection steps 524 of identifying the potential parent node that has the highest average RSSI value. In such instances, the network management application 242 could identify, from the group of potential parent nodes, a single BPD node having the highest average RSSI value as the target parent node.

At step 610, the joining BPD node 350 determines whether the pre-selection step identified a single potential parent node from the entries 420-428 included in the PPT 400. In various embodiments, the network management application 242 could identify, from the entries 420-428, a single potential parent node (e.g., the single potential parent node having the highest average RSSI value) as the target parent node. When the network management application 242 identifies a target parent node from the pre-selection step, the joining BPD node 350 proceeds to step 614; otherwise, the network management application 242 determines that two or more entries 420-428 in the PPT 400 remain after the pre-selection step and the network management application 242 proceeds to step 612.

At step 612, the joining BPD node 350 performs parent selection to identify a single potential parent node 330 as the target parent node. In various embodiments, the network management application 242 may load a set of network optimization criteria 244 stored in the memory subsystem 240. The network management application 242 may then compare the subset of entries in the PPT 400 against the criteria specified by the network optimization criteria 244. In various embodiments, the network optimization criteria 244 specifies an order of separate criteria, corresponding to an order of importance, that the network management application 242 is to compare in order to filter the subset of entries in the PPT 400 down to a single entry that the network management application 242 identifies as the target parent node.

For example, the network management application 242 could apply the B_EQ network optimization criteria 244 by first evaluating the LSI values of the subset of entries (e.g., entries 422-426) in the PPT 400. The network management application 242 identifies the specific potential parent node having the lowest LSI value as the target parent node. Otherwise, when the network management application 242 identifies two or more entries in the PPT 360 having the same LSI value (e.g., entries 422, 426), then the network management application 242 uses a second criterion, where the network management application 242 compares the respective hop count values of the remaining potential parent nodes 504, 506, and selects the specific parent node (e.g., the potential parent node 336 corresponding to the entry 422) having the lowest number of hops to the DC node 322 at the target parent node.

At step 614, the joining BPD node 350 sends an association request message to the target parent node. In various embodiments, the joining BPD node 350 may initiate the parent association process 530 by sending an association request message to the target parent node. In various embodiments, upon identifying a single potential parent node (e.g., the potential parent node 336) as the target parent node, the joining BPD node 350 sends an association request message 532 to the potential parent node 336 to join the BPD subtree 300 as a child to the potential parent node 336. In some embodiments, the association request message 532 may include node data associated with the joining BPD node 350. Additionally or alternatively, the association request message 532 may be a security request message that the joining BPD node 350 sends in order to get security information (e.g., a security key update) from the BPD subtree 300.

At step 616, the joining BPD node 350 receives an association response message from the potential parent node 336. In various embodiments, the potential parent node 336 responds to receiving the association request message 532 by evaluating various acceptance criteria against the node data provided by the joining BPD node 350. Upon evaluating the acceptance criteria, the potential parent node 504 may transmit an association response message 536 that indicates acceptance or denial of the association request message 532. At step 618, the joining BPD node 350 determines whether the joining BPD node 350 can successfully connect to the target parent node 336. When the joining BPD node 350 determines that the association response message is an acceptance, the joining BPD node proceeds to step 620 by sending an acknowledgement (ACK) message 548 to the target parent node 336. Otherwise, the joining BPD node 350 determines that the association response message is a denial to establish a communications link, and proceeds to step 622.

At step 622, the joining BPD node 350 marks the entry 422 for the target parent node 336 in the PPT 400 as unavailable. In various embodiments, the network management application 242 included in the joining BPD node 350 responds to receiving the association response message 536 indicating a denial by removing the entry 422 for the potential parent node 336 from the PPT 400. In some embodiments, the joining BPD node 350 may optionally, at step 624, receive updated node data for the remaining entries in the PPT 400 and may optionally update the PPT 400 with the updated data. Upon removing the target parent node 336 and optionally updating the PPT 400, the joining BPD node 350 may return to step 606 to perform additional pre-selection steps and/or parent selection steps in order to select a new target parent node.

Figure 7:
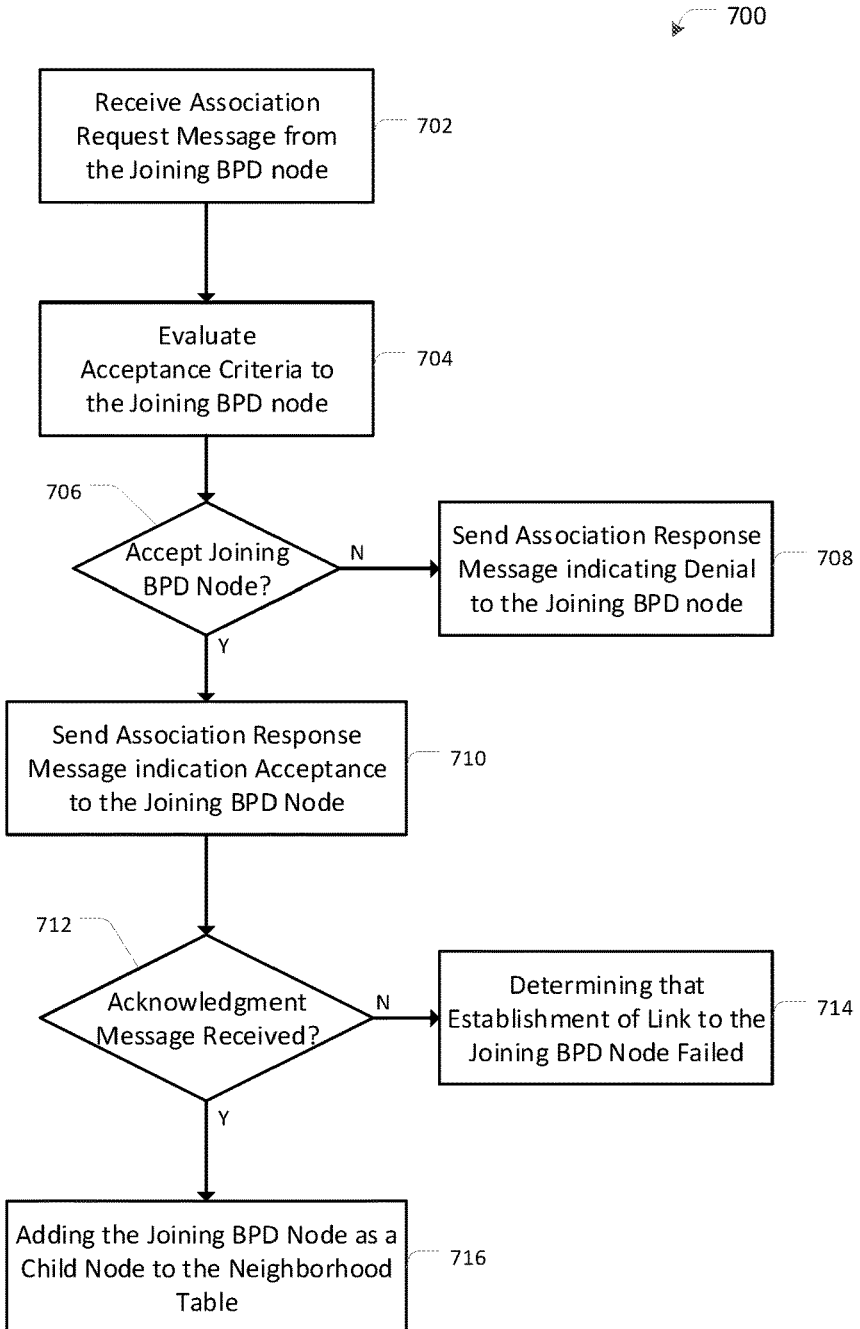
FIG. 7 is a flow diagram of method steps for adding a neighboring node device as a child node, according to various embodiments.

FIG. 7 is a flow diagram of method steps for adding a neighboring node device as a child node, according to various embodiments. Although the method steps are described in conjunction with the systems of FIGS. 1-5, persons skilled in the art will understand that any system can be configured to perform the method steps in any order.

As shown, method 700 begins at step 702, where a potential parent node (e.g., BPD node 336) receives an association request message from a joining BPD node 350. In various embodiments, a network management application 242 included in the potential parent node 336 may receive an association request message 532 from a joining BPD node 350 that indicates that the joining BPD node 350 is attempting to establish a bi-directional communications link 312 with the potential parent node 336 and join the BPD subtree 300 as a child node to the potential parent node 336.

At step 704, the potential parent node 336 evaluates acceptance criteria associated with establishing a connection with the joining BPD node 350. In various embodiments, the network management application 242 included in the potential parent node 336 may respond to receiving the association request message 532 transmitted by the joining BPD node 350 by evaluating various acceptance criteria against the node data provided by the joining BPD node 350. In some embodiments, the acceptance criteria may include parameters associated with the BPD subtree 300, including overall subtree parameters (e.g., each BPD node in the BPD subtree 300 can be attached to only a single parent node and cannot have multiple parent nodes). Additionally or alternatively, the acceptance criteria may include BPD-node-specific parameters, such as whether the joining BPD node 350 is listed in a stored node table 246 of the potential parent node 336, such as a neighborhood table and a discovery beacon response table, and whether the LSI value of the potential parent node 504 and the LSI values of each parent node (e.g., the BPD node 324) to the potential parent node 336 are all below a maximum load threshold.

In such instances, the potential parent node 336 may accept the joining BPD node 350 connecting to the potential parent node 336 upon determining that (i) the connection would not violate any of the specified parameters for the BPD subtree 300, (ii) the joining BPD node 350 is listed in at least one node table 246, and (iii) each respective LSI value of the potential parent node 336 and its parent node 324 falls below the maximum load threshold.

At step 706, the potential parent node 336 determines whether to accept the joining BPD node 350 based on the acceptance criteria. Upon evaluating the acceptance criteria, the potential parent node 504 may transmit an association response message 536 that indicates acceptance or denial of the association request message 532.

For example, the potential parent node 336 could determine that the association request message does not pass the acceptance criteria. In such instances, the network management application 242 could proceed to step 708, where the potential parent node 336 sends an association response message 536 indicating a denial of the association request message 532 to connect to the potential parent node 336. In another example, the potential parent node 336 could determine that the association request message passes the acceptance criteria. In such instances, the network management application 242 could proceed to step 710, where the potential parent node 336 sends an association response message

546 indicating an acceptance of the association request message 532 to connect to the potential parent node 336.

At step 712, the potential parent node 336 determines whether an acknowledgement message was received from the joining BPD node 350. In various embodiments, the joining BPD node 350 may respond to receiving the association response message 546 indicating an acceptance by sending an acknowledgement message 548 to the potential parent node 336. In such instances, the acknowledgement message 548 may indicate that the joining BPD node 350 received the association response message 546 and will establish a bi-directional communication link 312 with the potential parent node 506. When the potential parent node 336 determines that the acknowledgement message 548 was not received, the potential parent node 336 may proceed to step 714 by determining that the connection to the joining BPD node 350 failed. Otherwise, when the potential parent node 336 determines that the acknowledgement message 548 was received, the potential parent node 336 may then proceed to step 716.

At step 716, the potential parent node 336 may optionally add an entry for the joining BPD node 350 to its neighborhood table. In some embodiments, the joining BPD node 350 may already have an entry in the neighborhood table of the potential parent node 336. In such instances, the potential parent node 336 may refrain from modifying the neighborhood table. Alternatively, the potential parent node 336 may only have an entry for the joining BPD node 350 in a discover beacon response table. In such instances, the potential parent node 336 may add an entry for the joining BPD node 350 in the neighborhood table for the potential parent node 336 as well.

In sum, a network management application in a battery-powered node device of a network incorporates various network optimization criteria in order to select a specific node in the network as a potential parent node. In various embodiments, the network management application in a potential child node generates a potential parent table that includes a set of neighboring nodes as potential parent nodes. The network management application executes a pre-selection step based on at least one criterion to filter the neighboring nodes into a subset of potential parent nodes. The network management application then analyzes the subset of potential parents nodes based on a specific set of optimization criteria. In some embodiments, the set of optimization criteria may include, among other things, minimizing (or maximizing) loads handled by a given parent node, minimizing the number of hops from the parent node to a root node, maximizing signal strength, and/or minimizing the mesh tree size. The network management application evaluates one or more potential parent nodes that are included in the subset using the one or more of the optimization criteria in order to select a specific parent node from the subset as a target parent node.

The network management application in the potential child node sends an association request message to the target parent node. The target parent node analyzes various node data and/or network data to one or more acceptance criteria to determine whether to add the potential child node as a new child. In various embodiments, the node data and/or network data may include data associated with the operation of the network and/or protocols that specify parameters for the network, including the current mesh tree size, the failure rate of existing connections, the existing load size, the maximum number of hops allowed, a maximum load threshold, and so forth. When the target parent node determines not to accept the association request, the target parent node sends a rejection message, and the potential child node determines a different potential parent node from the subset as the next target parent node. When the target parent node determines to accept the association request, the target parent node sends an acceptance message and adds the potential child node as a new child.

At least one technical advantage of the disclosed techniques relative to the prior art is that, with the disclosed techniques, a battery-powered device can efficiently join an existing network in a manner that optimizes the efficiency of communications between nodes in the network. In particular, by performing a multi-step filtering and evaluation technique to target a specific node within an existing network as a potential parent, a battery-powered device can efficiently select a specific node from a group of potential nodes, all without computing a complex formula that consumes more processing resources and decreases battery life. Further, by executing the technique to select a parent based on network optimization criteria, a given battery-powered device can automatically join an existing network in a manner that adheres to optimization criteria that is specified by network managers. These technical advantages represent one or more technological improvements over prior-art approaches.

1. In various embodiments, a system within a wireless network comprising a set of battery-powered device (BPD) nodes within the wireless network, each BPD node in the set of BPD nodes including a memory storing instructions, and a processor coupled to memory that executes the instructions, and a joining BPD node within the wireless network, the joining BPD node including a second memory storing a network management application, and a second processor coupled to the memory that executes the network management application to identify, in a subset of BPD nodes within the wireless network, the set of BPD nodes as a set of potential parent nodes, filter, based on a set of network optimization criteria, the set of BPD nodes to identify a target parent node in the set of BPD nodes, and transmitting a request message to establish a communications link with the target parent node as a child node, where the target parent node in the set of BPD nodes executes the instructions to receive the request message from the joining BPD node, evaluate data associated with the joining BPD node with a set of acceptance criteria, and upon determining that the joining BPD node meets the set of acceptance criteria, establish the communications link with the joining BPD node, where, upon the communications link being established, the joining BPD node is a child node to the target parent node.

2. The system of clause 1, where the second processor further executes the network management application to perform, based on a first criterion that is not included in the set of network optimization criteria, a pre-selection of the set of potential parent nodes from the subset of BPD nodes.

3. The system of clause 1 or 2, where the set of network optimization criteria includes a first criterion that filters the set of potential parent nodes into a first subset of potential parent nodes, and a second criterion that filters the first subset of potential parent nodes into a second subset of potential parent nodes.

4. The system of any of clauses 1-3, where the first criterion or the second criterion is based on a metric of a load size associated with each potential parent node in the set of potential parent nodes, a metric of a number of hops associated with each potential parent node in the set of potential parent nodes, a metric of a signal strength associated with each potential parent node in the set of potential parent nodes, a metric of an average re-boot time associated with each potential parent node in the set of potential parent nodes, a metric of a battery-backed route associated with each potential parent node in the set of potential parent nodes, a metric of an IPv4 addressable route associated with each potential parent node in the set of potential parent nodes, a metric of an IPv6 addressable route associated with each potential parent node in the set of potential parent nodes, or a metric of one or more security credentials associated with each potential parent node in the set of potential parent nodes.

5. The system of any of clauses 1-4, where the second memory further stores the set of network optimization criteria.

6. The system of any of clauses 1-5, where the second processor further executes the network management application by generating a potential parent table (PPT) that lists each potential parent node in the set of potential parent nodes.

7. The system of any of clauses 1-6, where the second processor further executes the network management application by in response to transmitting the request message, receiving, from the target parent node, a response message denying establishment the communications link with the target parent node, removing the target parent node from the set of potential parent nodes to generate an updated set of potential parent nodes, and filtering, based on the set of network optimization criteria, the set of potential parent nodes to identify an updated target parent node.

8. The system any of clauses 1-7, where the set of acceptance criteria includes one or more parameters associated with a subtree of BPD nodes within a wireless network that includes the target parent node.

9. The system of any of clauses 1-8, where the set of acceptance criteria includes at least one of an entry in a node table stored by the target parent node, or a metric of a load size associated with at least the target parent node.

10. In various embodiments, a computer-implemented method for performing node-based operations within a wireless network, the method comprising identifying, in a subset of battery powered device (BPD) nodes within the wireless network, a set of potential parent nodes, filtering, based on a set of network optimization criteria, the set of potential parent nodes to identify a target parent node, and transmitting, by a joining BPD node within the wireless network, a request message to establish a communications link with the target parent node.

11. The computer-implemented method of clause 10, further comprising performing, based on a first criterion that is not included in the set of network optimization criteria, a pre-selection of the set of potential parent nodes from the subset of BPD nodes.

12. The computer-implemented method of clause 10 or 11, where the set of network optimization criteria includes a first criterion that filters the set of potential parent nodes into a first subset of potential parent nodes, and a second criterion that filters the first subset of potential parent nodes into a second subset of potential parent nodes.

13. The computer-implemented method of any of clauses 10-12, where the first criterion or the second criterion is based on a metric of a load size associated with each potential parent node in the set of potential parent nodes, a metric of a number of hops associated with each potential parent node in the set of potential parent nodes, a metric of a signal strength associated with each potential parent node in the set of potential parent nodes, a metric of an average re-boot time associated with each potential parent node in the set of potential parent nodes, a metric of a battery-backed route associated with each potential parent node in the set of potential parent nodes, a metric of an IPv4 addressable route associated with each potential parent node in the set of potential parent nodes, a metric of an IPv6 addressable route associated with each potential parent node in the set of potential parent nodes, or a metric of one or more security credentials associated with each potential parent node in the set of potential parent nodes.

14. The computer-implemented method of any of clauses 10-13, where the joining BPD node stores the set of network optimization criteria.

15. The computer-implemented method of any of clauses 10-14, further comprising generating a potential parent table (PPT) that lists each potential parent node in the set of potential parent nodes.

16. The computer-implemented method of any of clauses 10-15, further comprising in response to transmitting the request message, receiving, from the target parent node, a response message denying establishment the communications link with the target parent node, removing the target parent node from the set of potential parent nodes to generate an updated set of potential parent nodes, and filtering, based on the set of network optimization criteria, the set of potential parent nodes to identify an updated target parent node.

17. In various embodiments, a computer-implemented method for performing node-based operations by performing the steps of receiving, by a target parent node from a joining battery powered device (BPD) node, a request message to establish a communications link as a child node, evaluating data associated with the joining BPD node with a set of acceptance criteria, and upon determining that the joining BPD node meets the set of acceptance criteria, establishing the communications link with the joining BPD node, where the joining BPD node is a child node to the target parent node, or upon determining that the joining BPD node does not meet the set of acceptance criteria, transmitting a response message denying establishment of the communications link with the target parent node.

18. The computer-implemented method of any of clauses 10-17, where the set of acceptance criteria includes one or more parameters associated with a subtree of BPD nodes within a wireless network that includes the target parent node.

19. The computer-implemented method of any of clauses 10-18, where the one or more parameters associated with the subtree of BPD nodes includes at least one of a maximum size of the subtree, a maximum number of child nodes for a given parent node in the subtree, or a maximum number of hops for a given node in the subtree.

20. The computer-implemented method of any of clauses 10-19, where the set of acceptance criteria includes at least one of an entry in a node table stored by the target parent node, or a metric of a load size associated with at least the target parent node.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method comprising:
   filtering, by a node in a mesh network using one or more first network optimization criteria, a set of potential parent nodes to generate a subset of potential parent nodes;
   selecting, by the node using one or more second network optimization criteria, a target parent node from the subset of potential parent nodes, wherein at least one of the one or more first network optimization criteria or the one or more second network optimization criteria is an amount of power being drawn from a battery of a potential parent node; and
   transmitting, by the node, a connection request to the target parent node.

2. The method of claim 1, wherein the one or more first network optimization criteria include whether respective potential parent nodes are within a threshold range of the node.

3. The method of claim 1, wherein the one or more first network optimization criteria or the one or more second network optimization criteria are one or more criteria associated with optimizing battery usage.

4. The method of claim 1, wherein the one or more first network optimization criteria or the one or more second network optimization criteria are one or more criteria associated with optimizing latency in the mesh network.

5. The method of claim 1, wherein the one or more first network optimization criteria or the one or more second network optimization criteria evaluate one or more of:
   a load size of respective potential parent nodes;
   a number of hops associated with the respective potential parent nodes;
   a signal strength associated with the respective potential parent nodes;
   an average re-boot time associated with the respective potential parent nodes;
   a battery-backed route associated with the respective potential parent nodes;
   an IPv4 addressable route associated with the respective potential parent nodes;

an IPv6 addressable route associated with the respective potential parent nodes; or one or more security credentials associated with the respective potential parent nodes.

6. The method of claim 1, further comprising receiving, by the node from respective potential parent nodes in the set of potential parent nodes, metric values associated with the one or more first network optimization criteria or the one or more second network optimization criteria.

7. The method of claim 6, wherein the metric values are received in one or more discovery response messages or one or more beacons transmitted by the respective potential parent nodes.

8. The method of claim 1, further comprising:

transmitting, by the node, one or more discovery messages; and determining, by the node, respective potential parent nodes in the set of potential parent nodes based on one or more responses received to the one or more discovery messages.

9. The method of claim 1, further comprising in response to receiving, by the node, an acceptance of the connection request:

establishing, by the node, a network connection with target parent node.

10. The method of claim 1, further comprising in response to receiving, by the node, a denial of the connection request:

removing, by the node, the target parent node from the set of potential parent nodes;

applying, by the node, the one or more first network optimization criteria and the one or more second network optimization criteria to select a second target parent node; and transmitting, by the node, a connection request to the second target parent node.

11. One or more non-transitory computer readable media storing instructions that, when executed by one or more processors of a first networking device in a mesh network, cause the one or more processors to perform operations comprising:

determining a first plurality of possible parent networking devices for the first networking device;

applying one or more first evaluation criteria to the first plurality of possible parent networking devices to determine a second plurality of possible parent networking devices;

applying one or more second evaluation criteria to the second plurality of possible parent networking devices to determine a preferred parent networking device, wherein at least one of the one or more first evaluation criteria or the one or more second evaluation criteria is an amount of power being drawn from a battery of a possible parent networking device; and sending, to the preferred parent networking device, a request to connect with the preferred parent networking device.

12. The one or more non-transitory computer readable media of claim 11, wherein the one or more first evaluation criteria include whether respective networking devices in the first plurality of possible parent networking devices responded to a discovery message within a threshold period of time.

13. The one or more non-transitory computer readable media of claim 11, wherein the one or more first evaluation criteria or the one or more second evaluation criteria include one or more criteria associated with battery usage in the mesh network or latency in the mesh network.

14. The one or more non-transitory computer readable media of claim 11, wherein the one or more second evaluation criteria include a plurality of evaluation criteria considered in an order of preference.

15. The one or more non-transitory computer readable media of claim 11, the one or more first evaluation criteria or the one or more second evaluation criteria are criteria that consider one or more of:

a load size metric of a respective possible parent networking device;

a number of hops metric of the respective possible parent networking device;

a signal strength metric of the respective possible parent networking device;

an average re-boot time metric of the respective possible parent networking device;

a battery-backed route associated with respective possible parent networking device;

an IPv4 addressable route associated with respective possible parent networking device;

an IPv6 addressable route associated with the respective possible parent networking device; and one or more security credentials of the respective possible parent networking device.

16. The one or more non-transitory computer readable media of claim 11, wherein the operations further comprise receiving, from the first plurality of possible parent networking devices, respective beacons or respective discovery response messages, the respective beacons or the respective discovery response messages including networking device evaluation data.

17. A node device in a mesh network, the node device comprising:

one or more processors; and a memory storing instructions that, when executed by the one or more processors, cause the one or more processors to perform operations comprising:

evaluating, using a first set of network optimizing criteria, a first plurality of node devices to identify a second plurality of node devices, the first plurality of devices being potential parents to the node device in the mesh network;

evaluating, using a second set of network optimizing criteria, the second plurality of node devices to identify a target parent node device, wherein at least one of the first set of network optimizing criteria or the second set of network optimizing criteria is an amount of power being drawn from a battery of a potential parent node device; and transmitting, to the target parent node device, a request to join a sub-tree of the mesh network that includes the target parent node device.

18. The node device of claim 17, wherein the first set of network optimizing criteria include whether respective node devices in the first plurality of node devices are within a threshold range of the node device.

19. The node device of claim 17, wherein the first set of network optimizing criteria or the second set of network optimizing criteria include one or more criteria for evaluating metrics associated with battery usage by node devices in the mesh network or metrics associated latency in the mesh network.

20. The node device of claim 17, wherein the node device is battery-powered.

* * * * *